(12) United States Patent
Shida et al.

(10) Patent No.: US 9,253,423 B2
(45) Date of Patent: Feb. 2, 2016

(54) SOLID-STATE IMAGE SENSING DEVICE

(71) Applicant: Renesas Electronics Corporation, Kawasaki-shi, Kanagawa (JP)

(72) Inventors: Koji Shida, Kanagawa (JP); Shunsuke Okura, Kanagawa (JP); Hirokazu Shimizu, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 14/066,670

(22) Filed: Oct. 29, 2013

(65) Prior Publication Data

US 2014/0118583 A1 May 1, 2014

(30) Foreign Application Priority Data

Oct. 30, 2012 (JP) ................................ 2012-239336

(51) Int. Cl.
*H04N 5/225* (2006.01)
*H04N 5/228* (2006.01)
*H04N 5/365* (2011.01)
*H04N 5/376* (2011.01)

(52) U.S. Cl.
CPC .......... *H04N 5/3658* (2013.01); *H04N 5/3765* (2013.01)

(58) Field of Classification Search
CPC ....................................................... H04N 5/335
USPC ........................................ 348/294, 308, 222.1
See application file for complete search history.

(56) References Cited

U.S. PATENT DOCUMENTS

| 7,948,533 | B2 | 5/2011 | Koseki | |
|---|---|---|---|---|
| 8,310,580 | B2 | 11/2012 | Suzuki et al. | |
| 2009/0033759 | A1* | 2/2009 | Wakabayashi | 348/222.1 |
| 2009/0040352 | A1* | 2/2009 | Kawaguchi | 348/308 |

FOREIGN PATENT DOCUMENTS

| JP | 2008-060872 A | 3/2008 |
|---|---|---|
| JP | 2011-050046 A | 3/2011 |

* cited by examiner

*Primary Examiner* — Joel Fosselman
(74) *Attorney, Agent, or Firm* — Shapiro, Gabor and Rosenberger, PLLC

(57) ABSTRACT

There is provided a solid-state image sensing device that can prevent the occurrence of vertical line noise with a simple circuit. A timing adjustment circuit generates a first clock supplied to a ramp generator and a second clock supplied to a counter so that a phase difference between the first clock and the second clock is within a predetermined range and differs according to lines in an image sensor.

6 Claims, 11 Drawing Sheets

SOLID-STATE IMAGE SENSING DEVICE

CROSS-REFERENCE TO RELATED APPLICATIONS

The disclosure of Japanese Patent Application No. 2012-239336 filed on Oct. 30, 2012 including the specification, drawings and abstract is incorporated herein by reference in its entirety.

BACKGROUND

The present invention relates to a solid-state image sensing device, and for example to a solid-state image sensing device having column ADCs (Analog to Digital Converters).

Many of solid-state image sensing devices for camera equipment or the like use CMOS sensors as image sensors and use simple integral ADC circuits for cost reduction. Further, even camera equipment or the like is required from the market to have a simple video shooting function. To increase the frame rate during video shooting without greatly increasing the overall cost, it is necessary to decrease the output bit precision of ADC to a level that does not greatly affect the image quality.

However, in such a CMOS sensor, for example, vertical line noise which does not appear in 12-bit output for photographs may appear in 10-bit output for video. This is known to be caused by quantization noise specific to a column ADC system having an ADC for each column of the image sensor. The following patent documents take the following measures against this problem.

In Japanese Unexamined Patent Publication No. 2008-60872 (Patent Document 1), a noise signal N2dim indicating random noise in two-dimensional space without temporal variation is added to a pixel signal So. A column ADC circuit (25) separately converts a reset level Srst and a signal level Ssig of the pixel signal having the noise signal N2dim added thereto into digital data independently, and takes the difference. By separately converting the two into digital data, with the noise signal N2dim added, the same noise effect appears on the AD conversion results of the two, thus canceling column-correlated noise. Although a quantization error associated with difference processing in a digital domain occurs, the quantization error can have no column correlation, and also the added noise signal N2dim can be removed. As for a specific way to generate the noise signal N2dim, a reset release interval TRelease is set to be shorter than a typical interval. That is, part of reset noise occurring during a reset operation by a reset transistor (36) as a pixel reset unit in a unit pixel (3) remains in the unit pixel as noise that is not removed by an offset removal operation by an operating point reset unit (offset removal unit) (330) in a voltage comparison unit (252).

In Japanese Unexamined Patent Publication No. 2011-50046 (Patent Document 2), a random offset of not more than +/−0.5LSB is added for each line to an offset of a DAC for generating a reference RAMP wave during ADC sampling, thereby reducing vertical streak noise. The offset addition is performed by current addition by an analog circuit.

SUMMARY

However, in the method of Patent Document 1, an electric charge (analog value) incidentally remaining each pixel by the shorter reset release interval than a required value is used as the noise signal N2dim. This does not provide a basis for random noise in two-dimensional space without temporal variation, essential for the noise signal, remaining in each unit pixel. As a result, peculiar residual electric charges might disadvantageously remain in the vertical line direction, depending on the manufacturing condition of the image sensor or the value of the previous frame. Further, since residual electric charges occur incidentally, to keep the noise signal N2dim below 1LSB to minimize a signal error, it becomes necessary to subtly adjust a reset release signal width. This requires the function of adjusting the reset release interval in accordance with the manufacturing characteristics of the image sensor and the gain of the ADC, which disadvantageously increases the circuit size or makes the design difficult.

In the method of Patent Document 2, it is necessary to add an analog current source for adding offset current. This requires manual design and layout of the analog current source and relative precision, which disadvantageously requires an area.

The other problems and novel features will become apparent from the description of this specification and the accompanying drawings.

According to one embodiment of the present invention, a timing adjustment circuit generates a first clock supplied to a ramp generator and a second clock supplied to a counter so that a phase difference between the first clock and the second clock is within a predetermined range and differs according to lines in an image sensor.

According to the one embodiment of the present invention, it is possible to prevent the occurrence of vertical line noise with a simple circuit.

DETAILED DESCRIPTION

Hereinafter, embodiments of the present invention will be described with reference to the drawings.

First Embodiment

Figure 1:
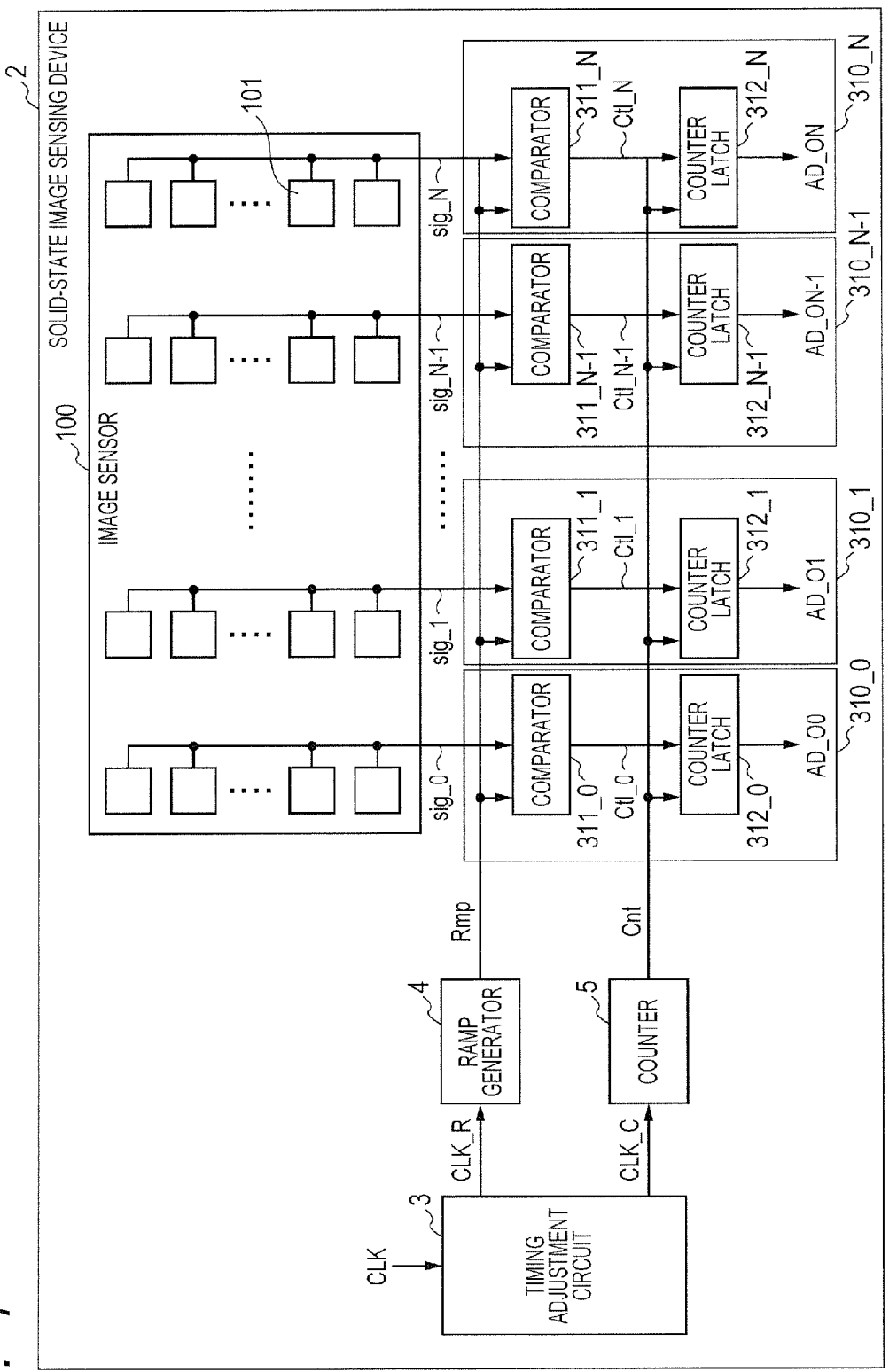
FIG. 1 is a diagram showing the configuration of a solid-state image sensing device according to a first embodiment.

FIG. 1 is a diagram showing the configuration of a solid-state image sensing device according to the first embodiment.

Referring to FIG. 1, the solid-state image sensing device 2 includes an image sensor 100, a timing adjustment circuit 3, a ramp generator 4, a counter 5, and column ADCs 310_0 to 310_N.

The image sensor 100 is comprised of a matrix of unit pixels 101. The columns of the matrix are columns 0 to N.

Unit pixels 101 contained in the ith column (i=0 to N) photoelectrically convert incident light into an analog pixel signal sig_i.

A column ADC 310_i (i=0 to N) is an integral A/D converter, including a comparator 311_i and a counter latch 312_i in the ith column of the image sensor 100.

The comparator 311_i compares the analog pixel signal sig_i from the image sensor 100 with a ramp signal from the ramp generator 4. The counter latch 312_i latches a count value outputted from the counter 5 at timing when the pixel signal sig_i matches the ramp signal at the comparator 311_i, and outputs it as a digital value AD_Oi of the pixel signal sig_i.

The ramp generator 4 generates and outputs a ramp signal in accordance with a clock CLK_R having a period T.

The counter 5 updates a count value in accordance with a clock CLK_C having a period that is identical to or an integral multiple of the period T of the clock CLK_R and having a different phase from that of the clock CLK_R.

The timing adjustment circuit 3 generates the clock CLK_R and the clock CLK_C so that the phase difference between the clock CLK_R and the clock CLK_C is within a predetermined range and differs according to lines in the image sensor 100.

As described above, according to this embodiment, it is possible to prevent the occurrence of vertical line noise with a simple circuit.

Second Embodiment

Figure 2:
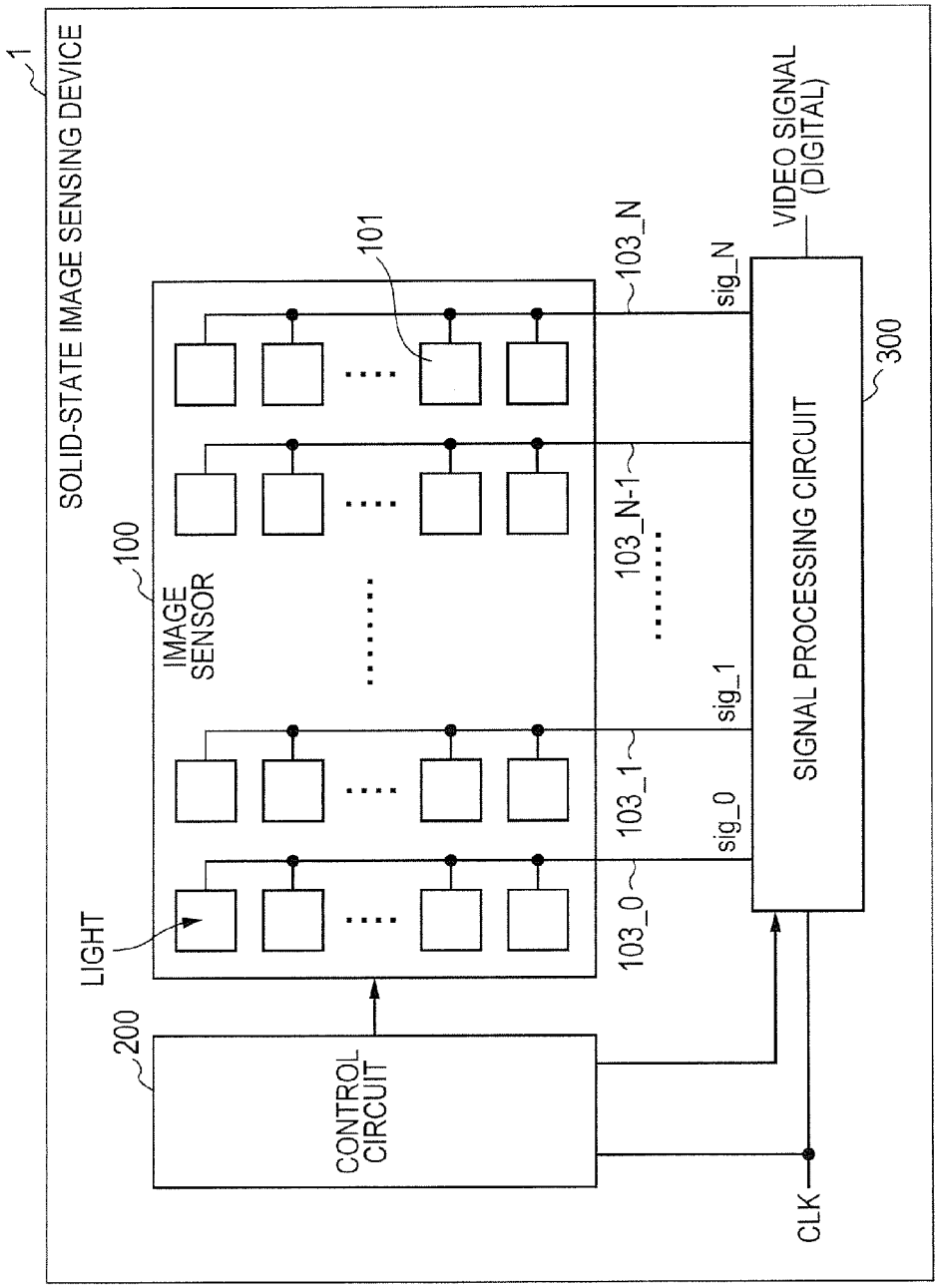
FIG. 2 is a diagram showing the configuration of solid-state image sensing device according to a second embodiment.

FIG. 2 is a diagram showing the configuration of a solid-state image sensing device according to the second embodiment.

Referring to FIG. 2, the solid-state image sensing device 1 includes an image sensor 100, a control circuit 200, and a signal processing circuit 300.

The control circuit 200 receives a reference clock CLK and outputs control signals to the image sensor 100 and the signal processing circuit 300.

The image sensor 100 is comprised of a matrix of unit pixels 101. Unit pixels 101 (j, i) form a column (V) coupling to a common pixel signal line 103_i and a line (H) coupling to different pixel signal lines 103_i. Unit pixels 101 in the ith column receive light and output analog signals according to the intensity of the light as pixel signals sig_i to pixel signal line 103_i in accordance with a control signal from the control circuit 200.

The control circuit 200 performs control so as to output the outputs of unit pixels 101_i in one line to the respective pixel signal lines 103_i at a time. The outputs sig_i of the pixel signal lines 103_i are sent to the signal processing circuit 300.

The signal processing circuit 300 receives the reference clock CLK and converts the input analog pixel signals sig_i into digital values as video signals.

Figure 3:
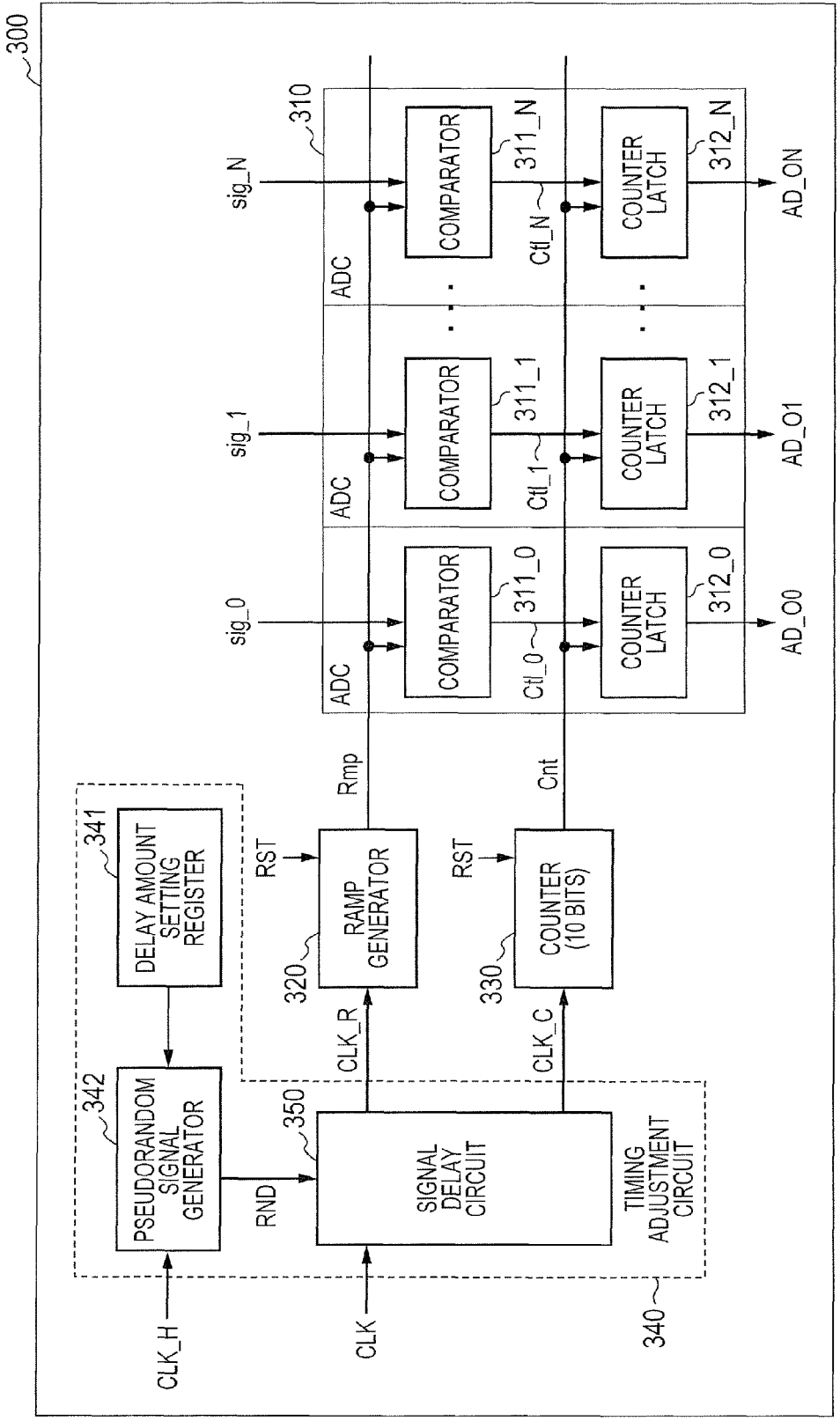
FIG. 3 is a diagram showing the configuration of a signal processing circuit according to the second embodiment.

FIG. 3 is a diagram showing the configuration of the signal processing circuit according to the second embodiment. Referring to FIG. 3, the signal processing circuit 300 includes a timing adjustment circuit 340, a ramp generator 320, a counter 330, and a column ADC 310.

The timing adjustment circuit 340 receives the reference clock CLK and a clock CLK_H synchronized with the reference clock CLK, and outputs a clock CLK_R and a clock CLK_C.

The timing adjustment circuit 340 generates the clock CLK_C by delaying the reference clock CLK by $\Delta T1$ in a random manner and generates the clock CLK_R by delaying the reference clock CLK by $\Delta T2$ in a random manner, for each line of the image sensor 100. The maximum difference between $\Delta T2$ and $\Delta T1$ is $(1-¼) \times T$.

The timing adjustment circuit 340 includes a delay amount setting register 341, a pseudorandom number generator 342, and a signal delay circuit 350.

The delay amount setting register 341 is a register for setting the range of delay amounts to be changed (maximum delay amount). The greater the range of delay amounts to be changed is, the greater random noise to be added is. The delay amount setting register 341 outputs the maximum delay amount and an initial value of the pseudorandom number generator 342.

The pseudorandom number generator 342 generates a random number RND between zero and the maximum delay amount at the timing of the clock CLK_H, based on the maximum delay amount and the initial value stored in the delay amount setting register 341, and outputs it to the signal delay circuit 350. The clock CLK_H is a clock that synchronizes to the reference clock CLK and indicates the signal processing start timing of one line (H).

The signal delay circuit 350 receives the reference clock CLK and the random number RND, and outputs the clock CLK_R to the ramp generator 320 and the clock CLK_C to the counter 330.

The ramp generator 320 generates an analog ramp signal Rmp to be compared with pixel signals from the image sensor 100, in accordance with the clock CLK_R.

The counter 330 outputs a count value Cnt in accordance with the clock CLK_C. The counter 330 receives the clock CLK_C from the timing adjustment circuit 340 and a reset signal RST which is one of the control signals from the control circuit 200, and outputs the count value Cnt. As with a counter 321 in the ramp generator 320, the counter 330 outputs "0" as the count value Cnt while the reset signal RST is at a high level, and, after the reset signal RST becomes a low level, counts rising edges of the clock CLK_C and outputs the number of rising edges as the count value Cnt.

A column ADC 310_i (i=0 to N), is provided in the ith column (i=0 to N) of the image sensor 100 and includes a comparator 311_i and a counter latch 312

The comparator 311_i receives the analog pixel signal sig_i outputted from each column of the image sensor 100 and the ramp signal Rmp from the ramp generator 320, and sets a counter latch control signal Ctl_i to the high level at timing when the two voltages match.

The counter latch 312_i latches the count value Cnt from the counter 330 at timing when the counter latch control signal Ctl_i becomes the high level. Thus, the ADC 310_i converts the analog pixel signal sig_i in each column into a digital value AD_Oi and outputs the digital value as a video signal.

The column ADC 310_i has a precision of 12 bits and has an error of less than 1LSB. In this embodiment, the column ADC 310_i outputs a 10-bit digital value and accordingly has inherent noise of less than $(¼) \times LSB$. This inherent noise is inherent in each individual column ADC 310_i; therefore, in the AD conversion of pixels in the same column, the same amount of noise is superimposed, so that vertical line noise appears in the obtained digital image. In this embodiment, in addition to the inherent noise, random noise for each line is applied so that different amounts of noise are superimposed in the AD conversion of pixels in the same column.

The column ADCs 310_0 to 310_N, the comparators 311_0 to 311_N, the counter latches 312_0 to 312_N, the pixel signals sig_0 to sig_N, the counter latch control signals Ctl_0 to Ctl_N, and the digital values AD_O0 to AD_ON are hereinafter occasionally referred to as the column ADC 310, the comparator 311, the counter latch 312, the pixel signal sig, the counter latch control signal Ctl, and the digital value AD_O, respectively.

(Ramp Generator)

Figure 4:
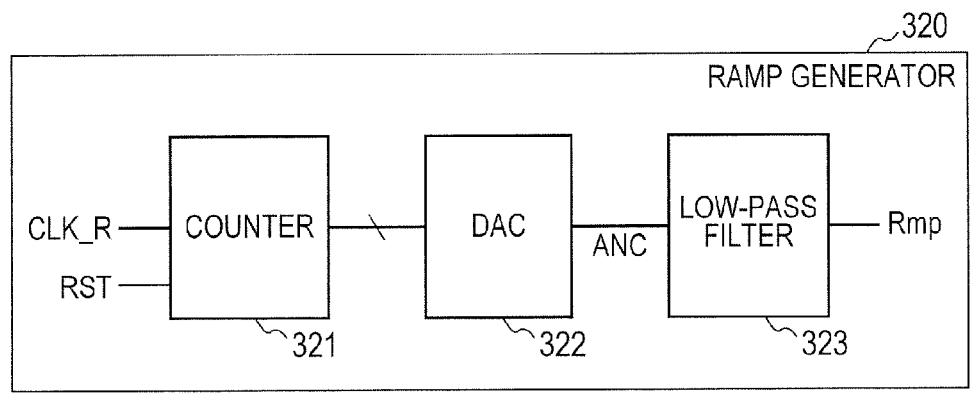
FIG. 4 is a diagram showing the configuration of a ramp generator.

FIG. 4 is a diagram showing the configuration of the ramp generator.

Referring to FIG. 4, the ramp generator 320 includes a counter 321, a DAC 322, and a low-pass filter 323.

The counter 321 receives the clock CLK_R for ramp generation from the timing adjustment circuit 340 and a reset signal RST which is one of the control signals from the control circuit 200, and outputs a count value.

The DAC 322 receives and converts the count value from the counter 321 into an analog signal ANC.

The low-pass filter 323 selects and outputs the low-frequency component of the output signal ANC of the DAC 322, thereby outputting the smoothly varying ramp signal Rmp. The low-pass filter 323 can be implemented by the combination of a series resistance R and a parallel capacitance C. The resistance R and the capacitance C may be prepared as elements, or parasitic elements may be used.

Figure 5:
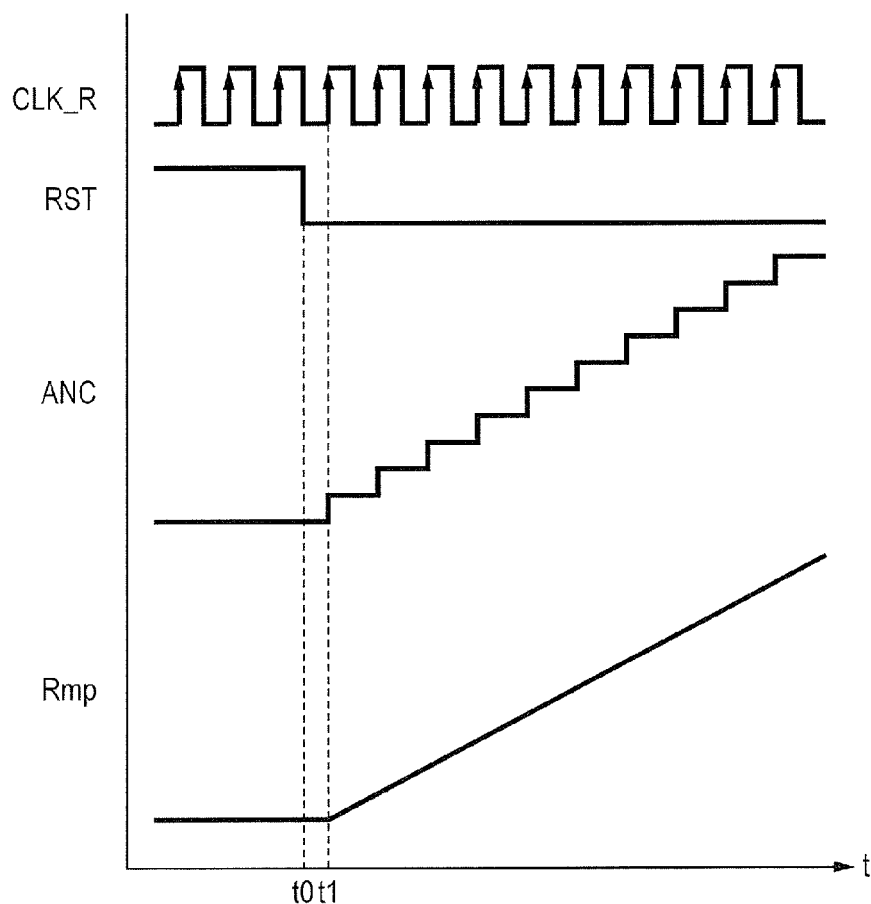
FIG. 5 is a diagram for explaining the generation process of a ramp signal Rmp.

FIG. 5 is a diagram for explaining the generation process of the ramp signal Rmp. The counter 321 outputs "0" as the count value when the reset signal RST is at the high level.

The counter 321 starts counting from time t0 when the reset signal RST changes to the low level, and counts up at rising edges (time t1, . . . ) of the clock CLK_R.

The DAC 322 converts the output value of the counter 321 into an analog voltage value and outputs it as the signal ANC. The DAC 322 increments the value by one at each rising edge of the clock CLK_R.

The low-pass filter 323 causes the signal ANC to smoothly vary, thus outputting the ramp signal Rmp. The ramp signal Rmp can be nearly a straight line by adjusting the parameter of the low-pass filter 323 and the period of the clock CLK_R.

While FIG. 5 shows the waveform equivalent to first several clocks, the above operations are repeated so that the ramp signal Rmp ranges from the minimum value to the maximum value of the pixel signal outputted from the image sensor 100.

(Signal Delay Circuit)

Figure 6:
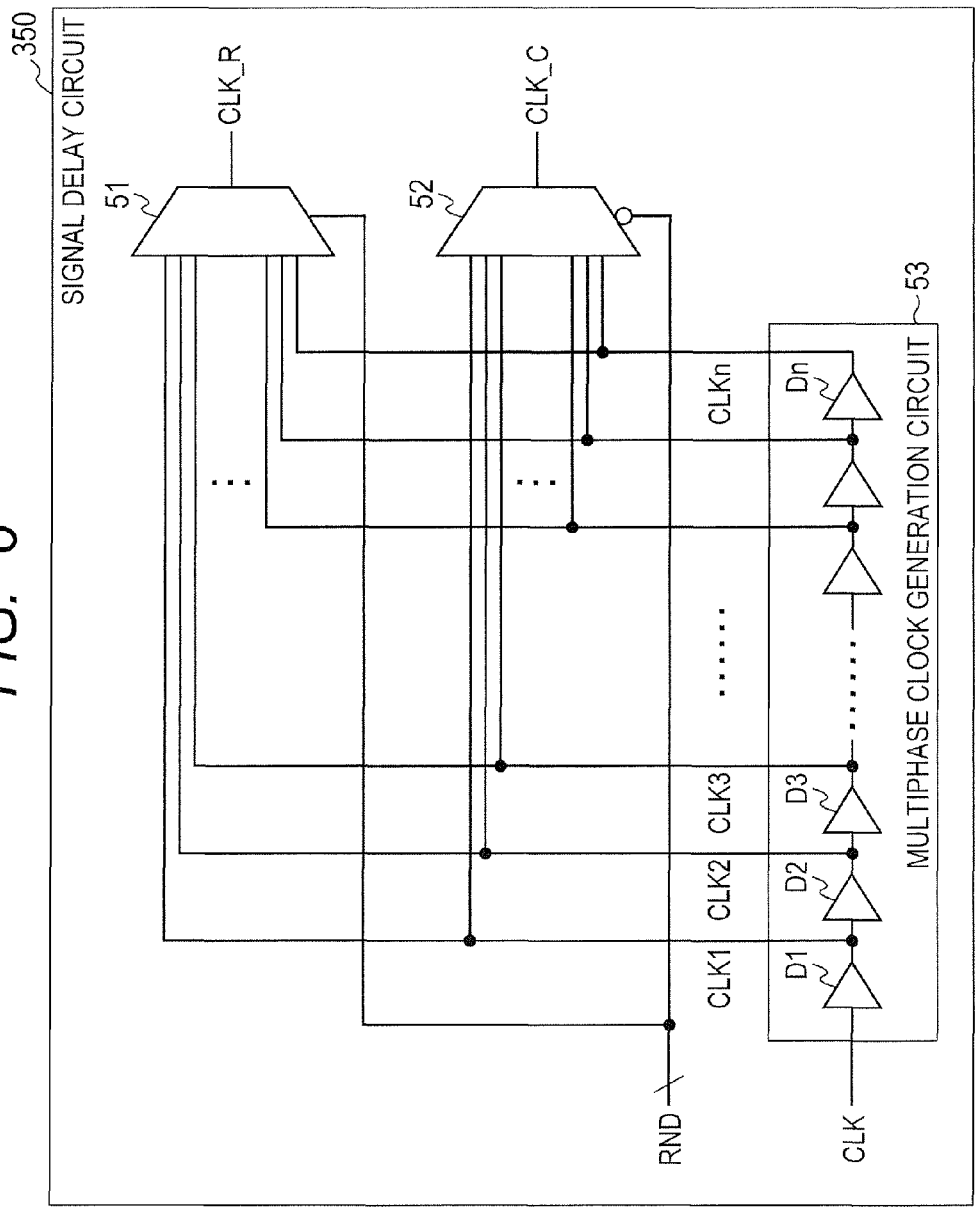
FIG. 6 is a diagram showing the configuration of a signal delay circuit according to the second embodiment.

FIG. 6 is a diagram showing the configuration of the signal delay circuit according to the second embodiment.

Referring to FIG. 6, the signal delay circuit 350 includes a multiphase clock generation circuit 53, a multiplexer 51, and a multiplexer 52.

The multiphase clock generation circuit 53 is configured by cascading unit delay gates D1 to Dn. The multiphase clock generation circuit 53 receives the clock CLK and outputs a plurality of delay clocks CLK1 to CLKn having a phase difference of each delay time of the unit delay gates.

The delay gate for generating the minimum delay clock CLK1 does not necessarily need to have a delay value, and may be an ordinary buffer gate. Alternatively, the input signal CLK may be directly outputted as the minimum delay clock CLK1 without passing through a buffer gate.

The multiplexer 51 receives the delay clocks CLK1 to CLKn from the multiphase clock generation circuit 53, selects one in accordance with the value of the random number RND, and outputs it as the clock CLK_R to the ramp generator 320. The clock CLK_R is generated by delaying the reference clock CLK by $\Delta T2$ in a random manner.

The multiplexer 52 receives the delay clocks CLK1 to CLKn from the multiphase clock generation circuit 53, selects one in accordance with the inverse value of the random number RND, and outputs it as the clock CLK_C to the counter 330. The clock CLK_C is generated by delaying the reference clock CLK by $\Delta T1$ in a random manner.

For example, if the maximum delay amount is "7", the random number RND is composed of 3 bits, and the value of the random number RND ranges from 0 to 7. The multiplexer 51 and the multiplexer 52 select and output any one of the clocks CLK1 to CLK8.

The time difference between the maximum delay clock CLK8 and the minimum delay clock CLK1 (i.e., the maximum difference between $\Delta T1$ and $\Delta T2$) is within a time of change of the output Rmp of the ramp generator 320 corresponding to $(1-\frac{1}{4}) \times LSB$ of the output of the ADC 310. This enables noise of less than 1LSB in total with addition to the inherent noise of less than $(\frac{1}{4}) \times LSB$ of the ADC 310. Since the time corresponding to 1LSB is the period T of the reference clock CLK, the phase difference between the maximum delay clock CLK8 and the minimum delay clock CLK1 is within $(1-\frac{1}{4}) \times T$.

If the delay amount of the clock CLK1 (i=1 to 8) with respect to the reference clock CLK is $i \times \Delta d$, the maximum delay amount is 8 $\Delta d$, and the minimum delay amount is $\Delta d$.

If the random number RND is "000b", the multiplexer 51 selects the clock CLK1 as the clock CLK_R based on the random number RND "000b", and the multiplexer 52 selects the clock CLK8 as the clock CLK_C based on the inverse value "111b" of the random number RND.

In this case, $\Delta T1$ (the delay amount of the clock CLK_C with respect to the reference clock CLK) is 8 $\Delta d$, and $\Delta T2$ (the delay amount of the clock CLK_R with respect to the reference clock CLK) is $\Delta d$. $(\Delta T1+\Delta T2)/2$ is equal to the average value (median value) of the maximum delay amount 8 $\Delta d$ and the minimum delay amount $\Delta d$.

Further, if the random number RND is "101b", the multiplexer 51 selects the clock CLK6 as the clock CLK_R based on the random number RND "101b", and the multiplexer 52 selects the clock CLK3 as the clock CLK_C based on the inverse value "010b" of the random number RND.

In this case, $\Delta T1$ (the delay amount of the clock CLK_C with respect to the reference clock CLK) is 3 $\Delta d$, and $\Delta T2$ (the delay amount of the clock CLK_R with respect to the reference clock CLK) is 6 $\Delta d$. $(\Delta T1+\Delta T2)/2$ is equal to the average value (median value) of the maximum delay amount 8 $\Delta d$ and the minimum delay amount $\Delta d$.

Thus, the average value of the delay amounts of two clocks selected by the multiplexers 51 and 52 can be maintained at the average value (constant value) of the maximum delay amount and the minimum delay amount.

(Counting Operation)

Figure 7A:
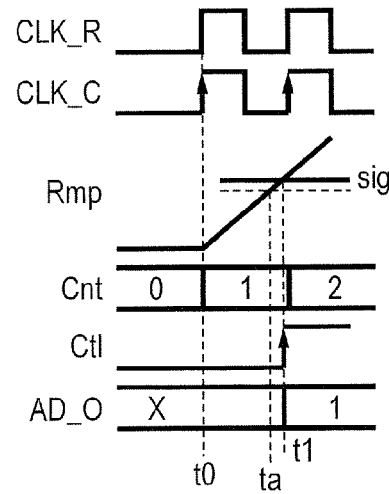
FIG. 7A is a diagram for explaining an operation in the case where the phase of a clock CLK_R is the same as that of clock CLK_C in the related art.

FIG. 7A is a diagram for explaining an operation in the case where the phase of the clock CLK_R is the same as that of the clock CLK_C in the related art.

In FIG. 7A, the phase of the clock CLK_R inputted to the ramp generator 320 is the same as that of the clock CLK_C inputted to the counter 330. The ramp signal Rmp is generated by the ramp generator 320 based on the clock CLK_R and inputted to the comparator 311. The pixel signal sig from the image sensor 100 is inputted to the comparator 311. The count value Cnt is incremented by the counter 330 based on the clock CLK_C.

The ramp signal Rmp rises at a rising edge of the clock CLK_R at time t0. The count value Cnt is updated to "1" at a rising edge of the clock CLK_C at time t0. The count value Cnt is incremented at each rising edge of the clock CLK_C.

Although the voltage of the ramp signal Rmp matches the voltage of the pixel signal sig at time ta in theory, the comparator 311 determines that the voltage of the ramp signal Rmp matches the voltage of the pixel signal sig at time t1 (>ta) due to error characteristics of the comparator 311, and the output signal Ctl of the comparator 311 rises. The counter latch 312 latches the count value Cnt "1" when the signal Ctl rises. Consequently, the digital value AD_O outputted from the column ADC 310 is "1". The difference between times ta and t1 is a fixed value for each individual comparator 311 which is less than (¼)×T.

Figure 7B:
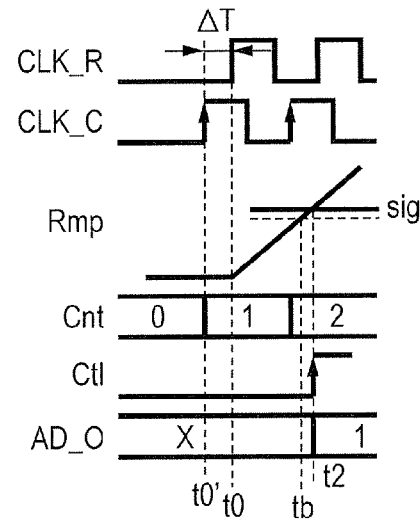
FIG. 7B is a diagram for explaining an operation in the case where the clock CLK_R is delayed relative to the clock CLK_C.

FIG. 7B is a diagram for explaining an operation in the case where the clock CLK_R is delayed relative to the clock CLK_C.

In FIG. 7B, by random noise added by the timing adjustment circuit 340, the clock CLK_R inputted to the ramp generator 320 is delayed relative to the clock CLK_C inputted to the counter 330. Letting ΔT denotes the phase difference between the clock CLK_C and the clock CLK_R, ΔT is equal to or less than (¾)×T.

The count value Cnt is updated to "1" at a rising edge of the clock CLK_C at time t0. The count value Cnt is incremented at each rising edge of the clock CLK_C. The ramp signal Rmp rises at a rising edge of the clock CLK_R at time t0.

Although the voltage of the ramp signal Rmp matches the voltage of the pixel signal sig at time tb in theory, the comparator 311 determines that the voltage of the ramp signal Rmp matches the voltage of the pixel signal sig at time t2 (>tb) due to error characteristics of the comparator 311, and the output signal Ctl of the comparator 311 rises. The counter latch 312 latches the count value Cnt "2" when the signal Ctl rises. Consequently, the digital value AD_O outputted from the column ADC 310 is "2". The difference ΔN between times tb and t2 is a fixed value for each individual comparator 311 which is less than (¼)×T. Further, the difference between times tb and ta is ΔT.

Thus, in this example, in addition to the fixed noise of ΔN (less than (¼)×T) in the related art, the random noise of ΔT (within (¾)×T) is applied. Consequently, the noise of less than 1T in total is applied. This random noise which differs for each line can prevent a vertical line from appearing due to inherent characteristics of each comparator 311.

In this embodiment, the AD conversion result becomes value 2 (+1 relative to the value in the related art); however, the addition result may be value 1 (+0), depending on the pixel signal voltage sig and the random number RND.

Figure 7C:
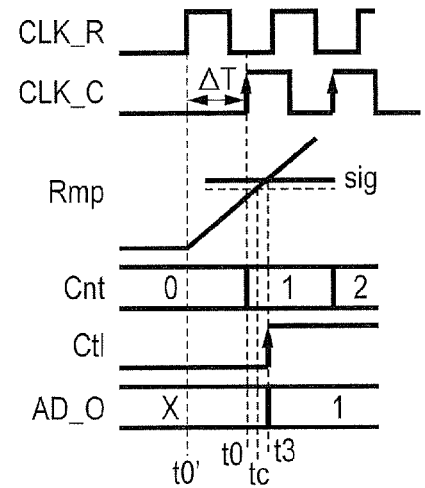
FIG. 7C is a diagram for explaining an operation in the case where the clock CLK_C is delayed relative to the clock CLK_R.

FIG. 7C is a diagram for explaining an operation in the case where the clock CLK_C is delayed relative to the clock CLK_R.

In FIG. 7C, by random noise added by the timing adjustment circuit 340, the clock CLK_C inputted to the counter 330 is delayed relative to the clock CLK_R inputted to the ramp generator 320. Letting ΔT denotes the phase difference between the clock CLK_C and the clock CLK_R, ΔT is equal to or less than (¾)×T.

The ramp signal Rmp rises at a rising edge of the clock CLK_R at time t0'. The count value Cnt is updated to "1" at a rising edge of the clock CLK_C at time t0. The count value Cnt is incremented at each rising edge of the clock CLK_C.

Although the voltage of the ramp signal Rmp matches the voltage of the pixel signal sig at time tc in theory, the comparator 311 determines that the voltage of the ramp signal Rmp matches the voltage of the pixel signal sig at time t3 (>tc) due to error characteristics of the comparator 311, and the output signal Ctl of the comparator 311 rises. The counter latch 312 latches the count value Cnt "1" when the signal Ctl rises. Consequently, the digital value AD_O outputted from the column ADC 310 is "1". The difference ΔN between times tc and t3 is a fixed value for each individual comparator 311 which is less than (¼)×T. Further, the difference between times tc and ta is ΔT.

Thus, in this example, in addition to the fixed noise of ΔN (less than (¼)×T) in the related art, the random noise of ΔT (within (¾)×T) is applied. Consequently, the noise of less than ½×T in total is applied in the opposite direction. This random noise which differs for each line can prevent vertical line noise from occurring due to inherent characteristics of each comparator 311.

In this embodiment, as a result of adding the noise of less than 1LSB, the AD conversion result becomes value 1 (−0 relative to the value without the noise); however, the subtraction result may be value 0 (−1), depending on the pixel signal voltage sig and the random number RND.

While the above embodiment is described by way of example in which the clock CLK_R and the clock CLK_C have the same period, the invention is not limited thereto. For example, even if the period of the clock CLK_C is an integral multiple of that of the clock CLK_R, the same advantageous effect can be obtained. In this case, the ramp signal Rmp becomes more nearly a straight line, which brings about an advantage that the average value of intentionally added random noise approaches zero.

Thus, in this embodiment, the random number RND is varied in each line processing of the image sensor 100, thereby varying the amount of random noise provided for each line, so that it is possible to add random noise to the pixel signal in the column direction. By generating the random number RND with a pseudorandom function of a long period, the average value of noise becomes zero in two dimensions over a long time. Further, by digitally generating the random number RND for determining the amount of noise, it is possible to implement the above processing with a simple circuit.

Thereby, it is possible to reduce quantization vertical line noise specific to a column ADC system at relatively low cost. That is, it is possible to effectively reduce a vertical streak in the column direction which is visible in the case of decreasing the output bit precision of ADC to increase the frame rate during video shooting.

In this embodiment, on the assumption that a range in which the period of the clock CLK fluctuates according to temperature or voltage is narrow, the multiphase clock generation circuit is configured with the fixed unit delay gates. However, in the case where the period of the clock CLK fluctuates greatly according to temperature and voltage, the multiphase clock generation circuit may be configured with DLL (Delay Locked Loop).

Further, while in this embodiment the error range of the digital value outputted from the column ADC is less than (¼)×LSB of the digital value and the phase difference between the clock CLK_R and the clock CLK_C is within (1−¼)×T, the invention is not limited thereto. In the case where the error range of the digital value outputted from the column ADC is less than (1/a)×LSB of the digital value, the phase difference between the clock CLK_R and the clock CLK_C can be within (1−1/a)×T.

Further, while in this embodiment the phase difference between the clock CLK_R and the clock CLK_C is set in a random manner for each line, the invention is not limited thereto and can use fixed values that are different for each line.

Third Embodiment

Figure 8:
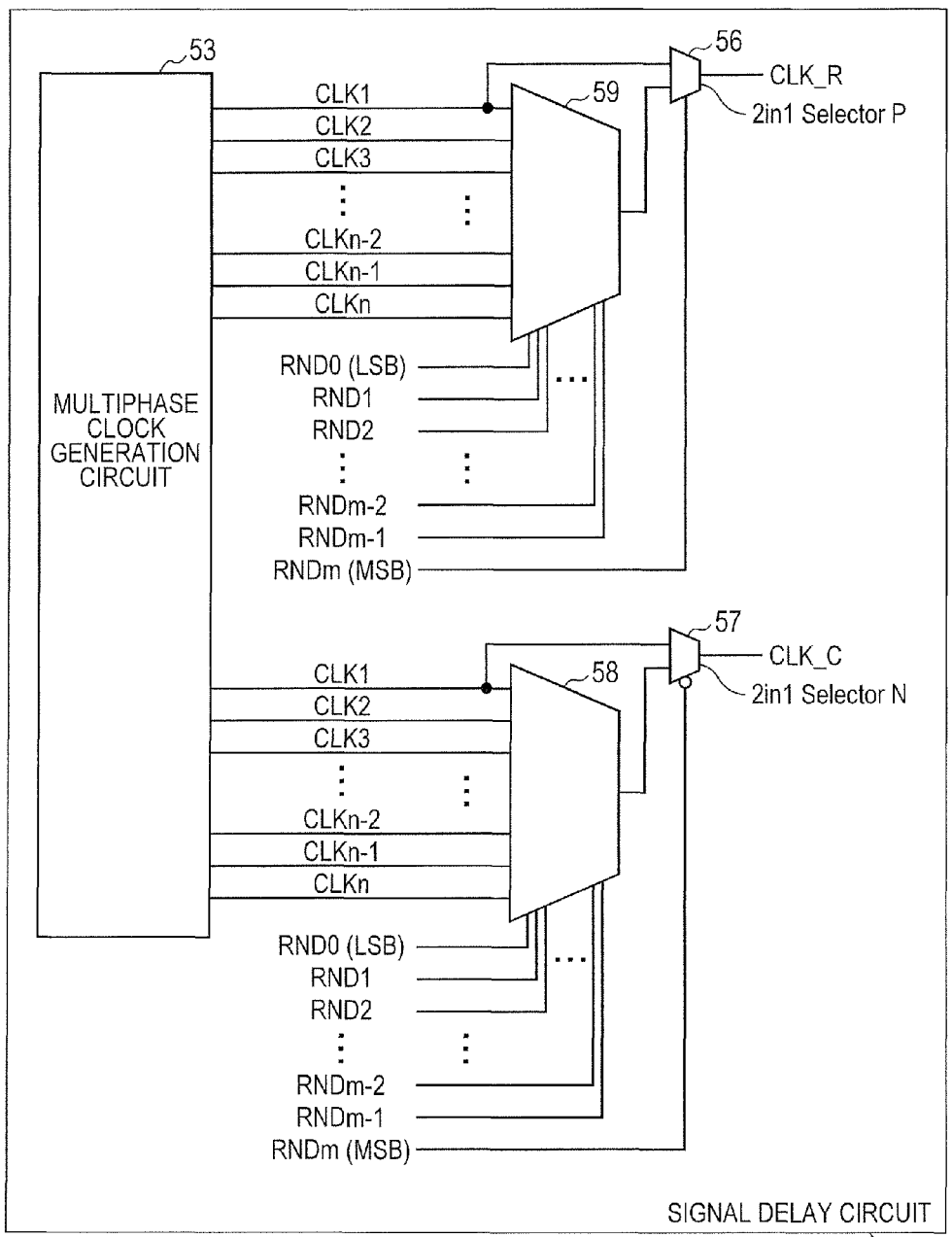
FIG. 8 is a diagram showing the configuration of a signal delay circuit according to a third embodiment.

FIG. 8 is a diagram showing the configuration of a signal delay circuit according to the third embodiment.

The signal delay circuit 357 includes a multiphase clock generation circuit 53, multiplexers 58, 59 and selectors 56, 57.

The multiplexer 59 receives multiphase delay clocks CLK1 to CLKn at data input terminals, and receives at control terminals the 0th bit to the (m−1)th bit of the random number RND generated by the pseudorandom number generator 342. The ith bit of the random number RND is represented as RNDi (i=0 to m). RND0 is the LSB (Least Significant Bit) of the random number RND, and RNDm is the MSB (Most Significant Bit) of the random number RND.

The multiplexer 59 selects and outputs the clock CLKi+1 from among the multiphase delay clocks CLK1 to CLKn if a value composed of the 0th bit to the (m−1)th bit of the random number RND is i. For example, the multiplexer 59 selects the clock CLK1 if the 0th bit to the (m−1)th bit of the random number RND are (0000 . . . 0b), and selects the clock CLK2 if the 0th bit to the (m−1)th bit of the random number RND are (0000 . . . 1b).

The selector 56 receives the output of the multiplexer 59 and the minimum delay clock CLK1 at data input terminals, and receives the mth bit RNDm of the random number RND at a control terminal.

The selector 56 selects the minimum delay clock CLK1 if RNDm is "0", selects the output of the multiplexer 59 if RNDm is "1", and outputs the selected clock as the clock CLK_R to the ramp generator 320.

The multiplexer 58 receives the multiphase delay clocks CLK1 to CLKn at data input terminals, and receives at control terminals the 0th bit to the (m−1)th bit of the random number RND generated by the pseudorandom number generator 342.

The multiplexer 58 selects and outputs the clock CLKi+1 from among the multiphase delay clocks CLK1 to CLKn if a value composed of the 0th bit to the (m−1)th bit of the random number RND is i. For example, the multiplexer 58 selects the clock CLK1 if the 0th bit to the (m−1)th bit of the random number RND are (0000 . . . 0b), and selects the clock CLK2 if the 0th bit to the (m−1)th bit of the random number RND are (0000 . . . 1b).

The selector 57 receives the output of the multiplexer 58 and the minimum delay clock CLK1 at data input terminals, and receives the inverse value of the mth bit RNDm of the random number RND at a control terminal.

The selector 57 selects the minimum delay clock CLK1 if the inverse value of RNDm is "0", selects the output of the multiplexer 58 if the inverse value of RNDm is "1", and outputs the selected clock as the clock CLK_C to the counter 330.

Thus, as with the second embodiment, this embodiment also can prevent the occurrence of vertical line noise.

Fourth Embodiment

Figure 9:
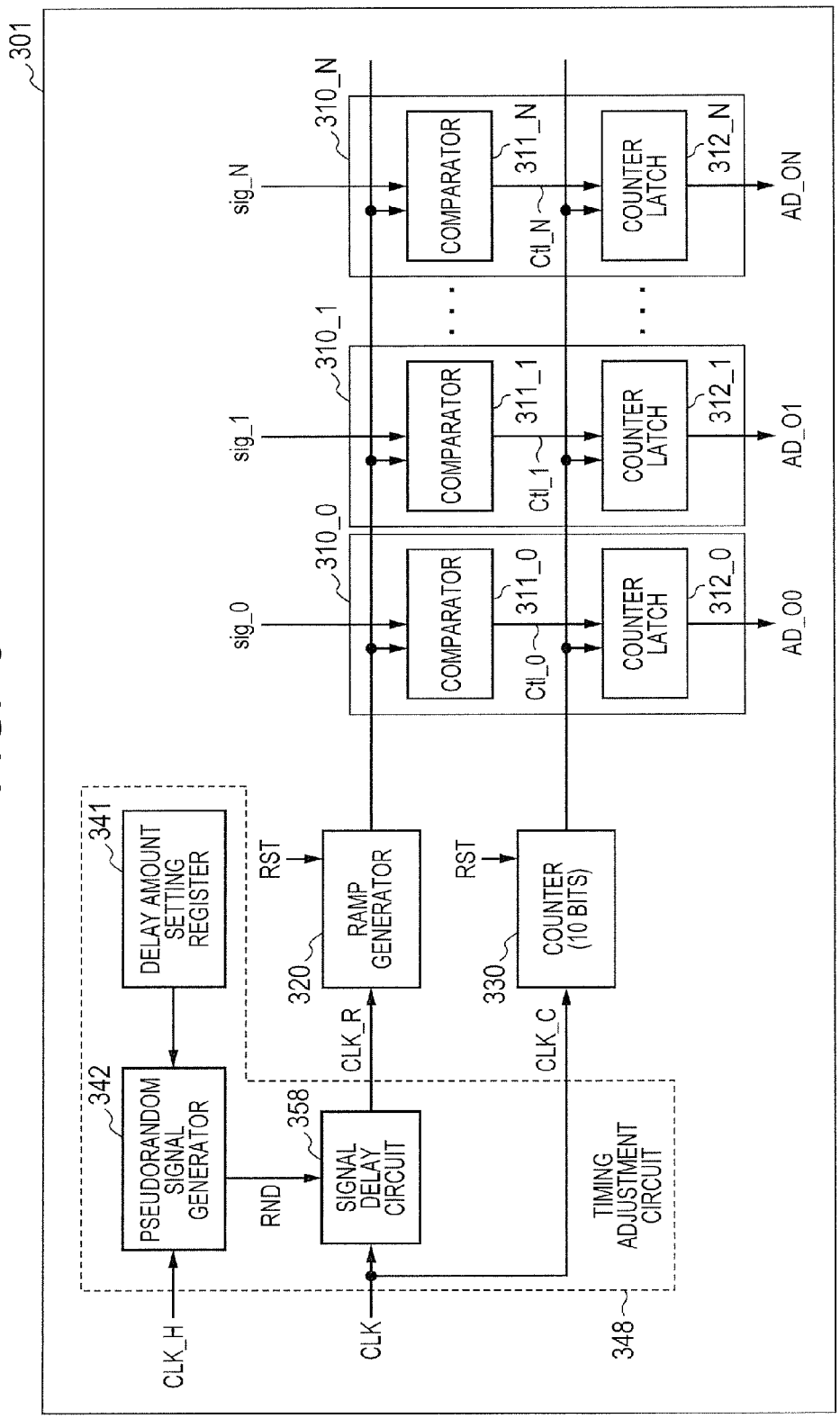
FIG. 9 is a diagram showing the configuration of a signal processing circuit according to a fourth embodiment.

FIG. 9 is a diagram showing the configuration of a signal processing circuit according to the fourth embodiment.

This signal processing circuit 301 differs in the timing adjustment circuit from the signal processing circuit 300 in FIG. 3.

The timing adjustment circuit 348 passes the reference clock CLK as the clock CLK_C. The timing adjustment circuit 348 generates the clock CLK_R by delaying the reference clock CLK by ΔT in a random manner. The maximum value of ΔT is (1−¼)×T. T is the period of the reference clock CLK.

The timing adjustment circuit 348 included in the signal processing circuit 301 includes a signal delay circuit 358 which differs from that of the second embodiment.

Further, the timing adjustment circuit 348 outputs the clock CLK as the clock CLK_C to the counter 330.

Figure 10:
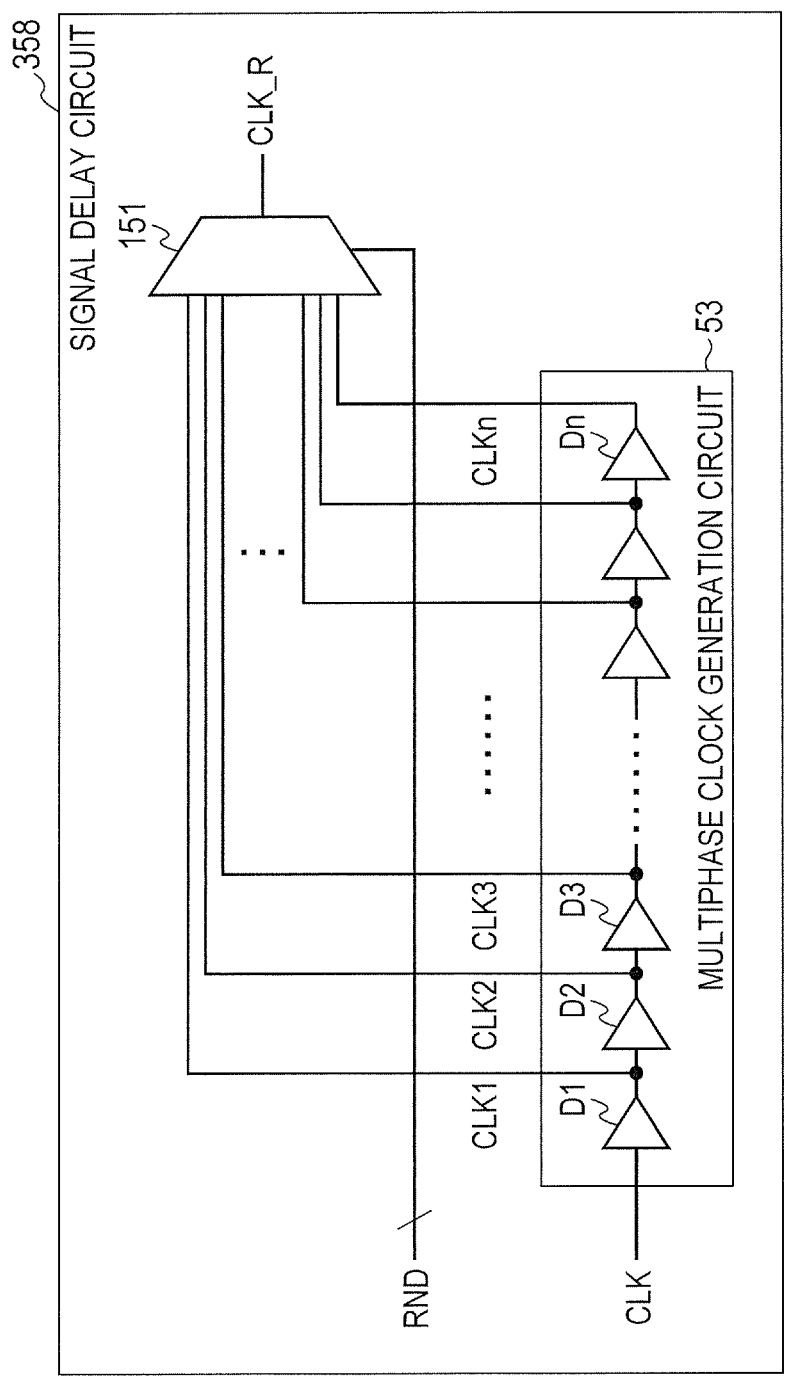
FIG. 10 is a diagram showing the configuration of a signal delay circuit according to the fourth embodiment.

FIG. 10 is a diagram showing the configuration of the signal delay circuit according to the fourth embodiment. The signal delay circuit 358 includes a multiphase clock generation circuit 53 and a multiplexer 151.

The multiphase clock generation circuit 53 is configured by cascading unit delay gates D1 to Dn. The multiphase clock generation circuit 53 receives the clock CLK and outputs a plurality of delay clocks CLK1 to CLKn having a phase difference of each delay time of the unit delay gates.

The multiplexer 151 receives the delay clocks CLK1 to CLKn from the multiphase clock generation circuit 53, selects one in accordance with the value of the random number RND, and outputs it as the clock CLK_R to the ramp generator.

For example, if the maximum delay amount is "7", the random number RND is composed of 3 bits, and the value of the random number RND ranges from 0 to 7. The multiplexer 151 selects and output any one of the clocks CLK1 to CLK8.

The time difference between the maximum delay clock CLK8 and the clock CLK (=the clock CLK_C) is within a time of change of the output Rmp of the ramp generator 320 corresponding to (1−¼)×LSB of the output of the ADC 310. This enables noise of less than 1LSB in total with addition to the inherent noise of less than (¼)×LSB of the ADC 310. Since the time corresponding to 1LSB is the period T of the reference clock CLK, the phase difference between the maximum delay clock CLK8 and the clock CLK (clock CLK_C) is within (1−¼)×T.

Thus, as with the second embodiment, this embodiment also can prevent the occurrence of vertical line noise.

Fifth Embodiment

Figure 11:
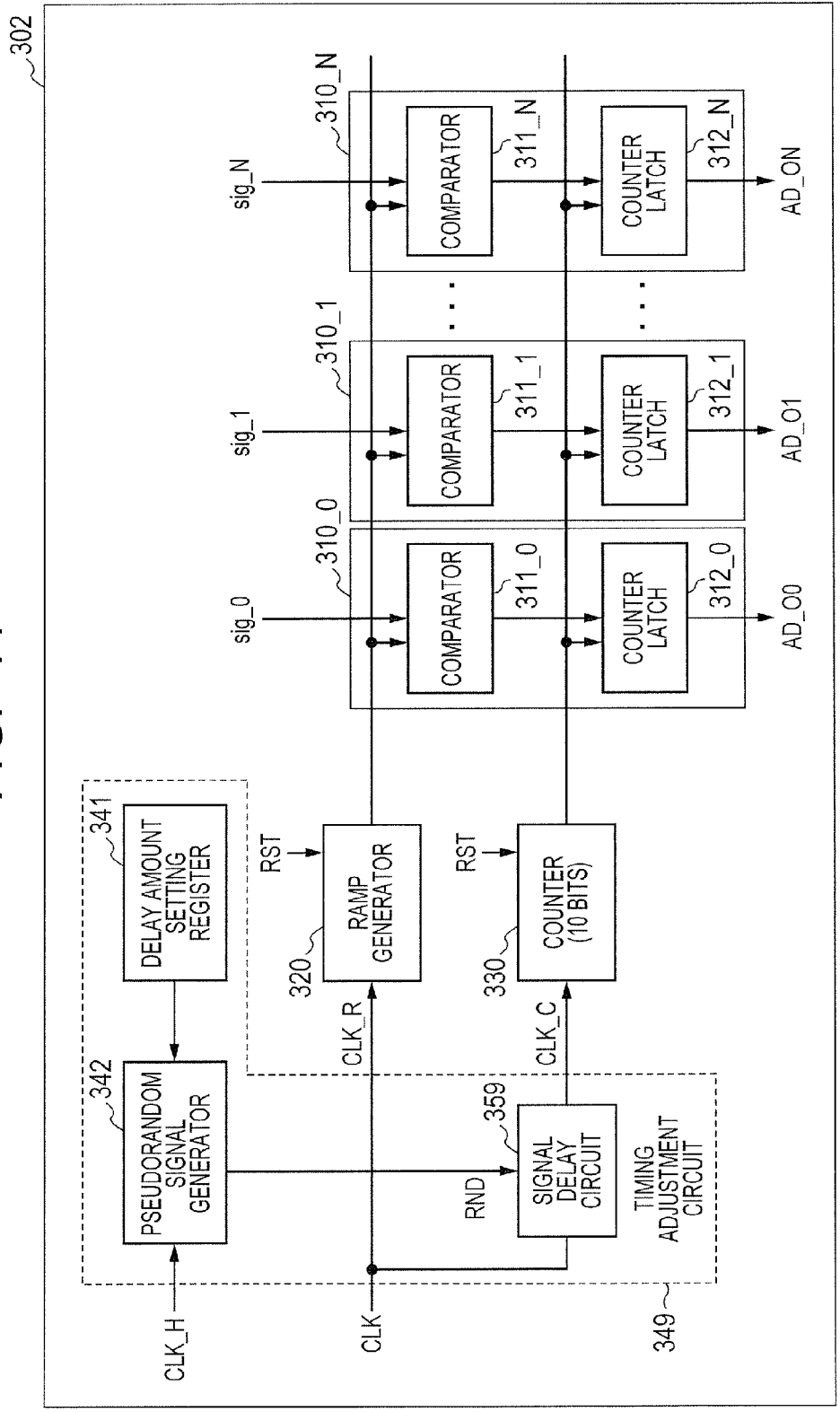
FIG. 11 is a diagram showing the configuration of a signal processing circuit according to a fifth embodiment.

FIG. 11 is a diagram showing the configuration of a signal processing circuit according to the fifth embodiment.

This signal processing circuit 302 differs in the timing adjustment circuit from the signal processing circuit 300 in FIG. 3.

The timing adjustment circuit 349 passes the reference clock CLK as the clock CLK_R. The timing adjustment circuit 349 generates the clock CLK_C by delaying the reference clock CLK by ΔT in a random manner. The maximum value of ΔT is (1−¼)×T, T is the period of the reference clock CLK.

The timing adjustment circuit 349 included in the signal processing circuit 302 includes a signal delay circuit 359 which differs from that of the second embodiment.

Further, the timing adjustment circuit 349 outputs the clock CLK as the clock CLK_R to the ramp generator 320.

Figure 12:
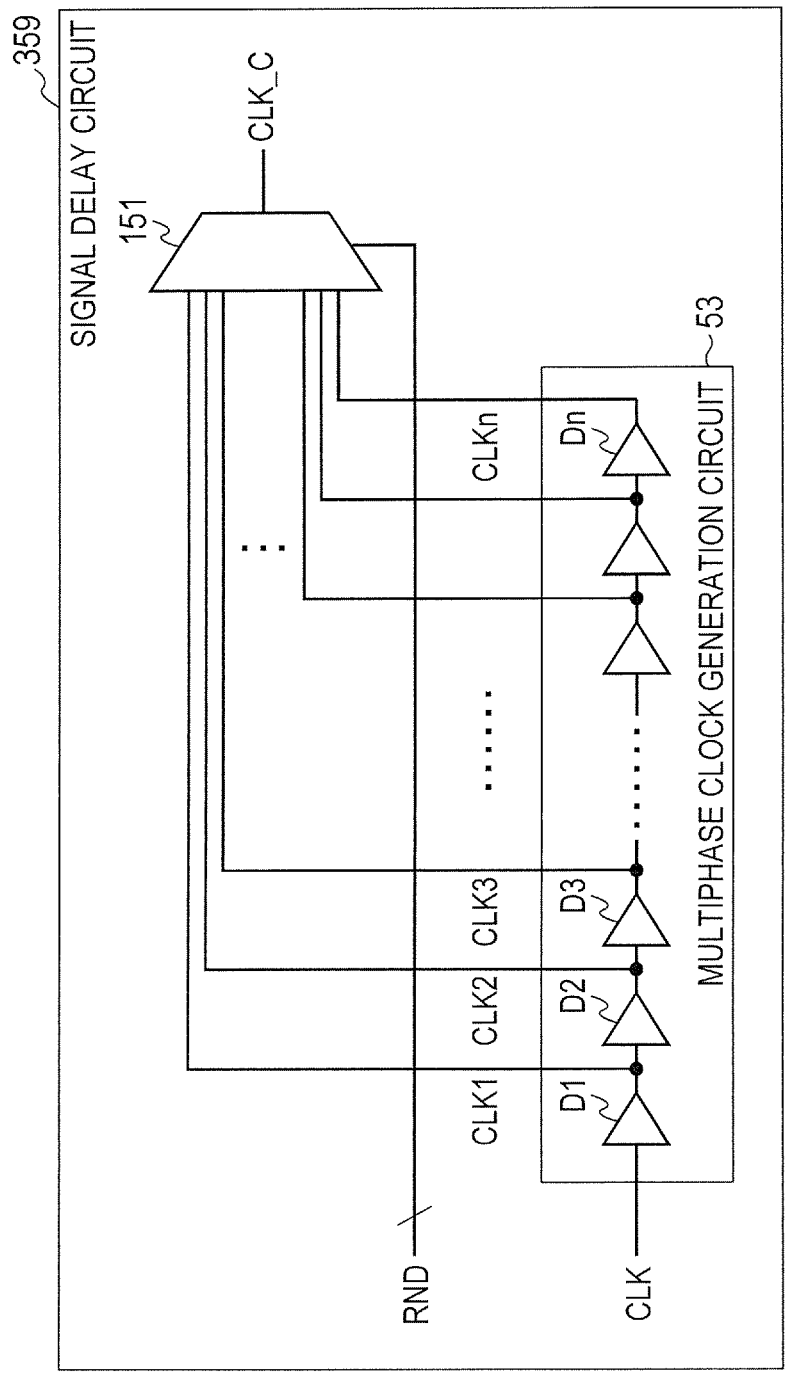
FIG. 12 is a diagram showing the configuration of a signal delay circuit according to the fifth embodiment.

FIG. 12 is a diagram showing the configuration of the signal delay circuit according to the fifth embodiment. The signal delay circuit 359 includes a multiphase clock generation circuit 53 and a multiplexer 151.

The multiphase clock generation circuit 53 is configured by cascading unit delay gates D1 to Dn. The multiphase clock generation circuit 53 receives the clock CLK and outputs a plurality of delay clocks CLK1 to CLKn having a phase difference of each delay time of the unit delay gates.

The multiplexer 151 receives the delay clocks CLK1 to CLKn from the multiphase clock generation circuit 53, selects one in accordance with the value of the random number RND, and outputs it as the clock CLK_C to the counter 330.

For example, if the maximum delay amount is "7", the random number RND is composed of 3 bits, and the value of the random number RND ranges from 0 to 7. The multiplexer 151 selects and output any one of the clocks CLK1 to CLK8.

The time difference between the maximum delay clock CLK8 and the clock CLK (=the clock CLK_R) is within a time of change of the output Rmp of the ramp generator 320 corresponding to $(1-¼)×LSB$ of the output of the ADC 310. This enables noise of less than 1LSB in total with addition to the inherent noise of less than $(¼)×LSB$ of the ADC 310. Since the time corresponding to 1LSB is the period T of the reference clock CLK, the phase difference between the maximum delay clock CLK8 and the clock CLK (clock CLK_R) is within $(1-¼)×T$.

Thus, as with the second embodiment, this embodiment also can prevent the occurrence of vertical line noise.

While the invention made above by the present inventors has been described specifically based on the illustrated embodiments, the present invention is not limited thereto. It is needless to say that various changes and modifications can be made thereto without departing from the spirit and scope of the invention.

What is claimed is:

1. A solid-state image sensing device comprising:
    an image sensor in which a plurality of unit pixels for photoelectrically converting incident light into an analog pixel signal are arranged in a matrix;
    a ramp generator for generating and outputting a ramp signal in accordance with a first clock having a period T;
    a counter for updating a count value in accordance with a second clock having a period that is identical to or an integral multiple of the period of the first clock and having a different phase from that of the first clock;
    a plurality of comparators which each compare an analog pixel signal from a corresponding column in the image sensor and a ramp signal from the ramp generator;
    a plurality of counter latches which each latch a count value outputted from the counter at timing when the pixel signal matches the ramp signal at a corresponding comparator, and output it as a digital value of the pixel signal; and
    a timing adjustment circuit for generating the first clock and the second clock so that a phase difference between the first clock and the second clock is within a predetermined range and differs according to lines in the image sensor,
    wherein if an error range of the digital value is 1/a of 1LSB (Least Significant Bit) of the digital value, the predetermined range is $(1-1/a)×T$.

2. The solid-state image sensing device according to claim 1, wherein the timing adjustment circuit generates the first clock and the second clock so that the phase difference between the first clock and the second clock becomes a random value within the predetermined range, for each line of the image sensor.

3. The solid-state image sensing device according to claim 2, wherein the timing adjustment circuit passes a reference clock as the first clock and generates the second clock by delaying the reference clock by $\Delta T$ in a random manner, and the maximum value of $\Delta T$ is $(1-1/a)×T$.

4. The solid-state image sensing device according to claim 2, wherein the timing adjustment circuit generates a reference clock as the second clock and generates the first clock by delaying the reference clock by $\Delta T$ in a random manner, and the maximum value of $\Delta T$ is $(1-1/a)×T$.

5. The solid-state image sensing device according to claim 2, wherein the timing adjustment circuit generates the first clock by delaying a reference clock by $\Delta T1$ in a random manner and generates the second clock by delaying the reference clock by $\Delta T2$ in a random manner, and the maximum difference between $\Delta T2$ and $\Delta T1$ is $(1-1/a)×T$.

6. The solid-state image sensing device according to claim 5, wherein the timing adjustment circuit generates the first clock and the second clock so that $(\Delta T1+\Delta T2)/2=(MAX+MIN)/2$, where MIN denotes the minimum value of $\Delta T1$ and $\Delta T2$, and MAX denotes the maximum value of $\Delta T1$ and $\Delta T2$.

* * * * *